No. 779,236. Patented January 3, 1905.

UNITED STATES PATENT OFFICE.

RUFUS LAFAYETTE ODOM, OF NASHVILLE, TENNESSEE, ASSIGNOR OF ONE-HALF TO HUGH W. PENNEL, OF MURFREESBORO, TENNESSEE.

INSECTICIDE.

SPECIFICATION forming part of Letters Patent No. 779,236, dated January 3, 1905.

Application filed May 2, 1903. Serial No. 155,400.

*To all whom it may concern:*

Be it known that I, RUFUS LAFAYETTE ODOM, a citizen of the United States, residing at Nashville, in the county of Davidson and State of Tennessee, have invented a new and useful Insecticide, of which the following is a specification.

This invention relates to insecticides, and more especially to insecticides for use upon fruit-trees, though the invention may be used to advantage upon shade-trees or shrubs subject to the ravages of insects.

The object of the invention is to provide an insecticide of thoroughly effective character which may be conveniently applied to the trees or shrubs injured by insects and which may be compounded at small cost.

In the attainment of the objects above stated I employ a mixture of the ingredients named below in the proportions specified: one pound of ninety-per-cent. carbolic acid, one pound of Fowler's solution of arsenic, six hundred grains of paris-green. These ingredients are preferably mixed with one and one-half gallons of water, and the insecticide is then ready for use.

In order to keep the paris-green uniformly distributed throughout the liquid and prevent settling, the insecticide should be shaken well before using and from time to time during its application.

The insecticide as thus described is applied directly to the trunks of trees and the roots by means of a brush and need not, unless the insects have already invaded the tree, be applied elsewhere.

The mode of application of the insecticide is first to remove the earth from the roots of the tree where they branch outward from the trunk and using a brush to apply to the roots and the trunk adjacent thereto a sufficient quantity of the insecticide to cover the surfaces on which it is applied. The earth will then be restored to its original position over the roots of the tree.

As stated in a preceding paragraph, the insecticide is intended more especially for use upon fruit-trees and is thoroughly effective in preventing the ravages of the peach-tree borer and aphis, which are the commonest and most destructive of the insects that ravage the orchards of this country.

The use of this insecticide upon shade-trees is productive of good results in destroying insects already upon the trees and in preventing the invasion of the trees by caterpillars and the like.

A special feature of this insecticide not found in other insecticides, so far as I am aware, is the stimulative effect which it has upon vegetation generally when applied thereto.

The insecticide being in liquid form is when applied to the roots of the tree absorbed to a certain extent by the cells of the roots, and entering into the sap of the tree it is distributed throughout the tree by the circulation of the sap and exerts an invigorating and stimulating influence upon the cells of the bark and leaves, thus leading to more rapid growth and increased vigor in the trees to which it is applied.

Having thus described the nature and use of my invention, what I claim as new, and desire to secure by Letters Patent, is—

The insecticide consisting of ninety-per-cent. carbolic acid, one pound; Fowler's solution of arsenic, one pound; paris-green, six hundred grains; and water, one and one-half gallons.

In testimony that I claim the foregoing as my own I have hereto affixed my signature in the presence of two witnesses.

RUFUS LAFAYETTE ODOM.

Witnesses:
RAYMOND A. ODOM,
A. V. ODOM.